June 7, 1966   M. B. COLLITO   3,254,651
SURGICAL ANASTOMOSIS METHODS AND DEVICES
Filed Sept. 12, 1962   2 Sheets-Sheet 1
FIG. 1
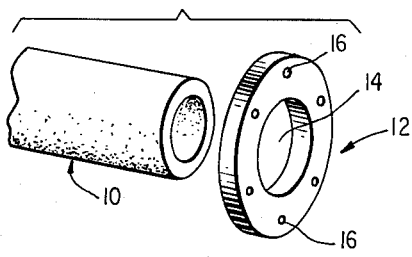
FIG. 2
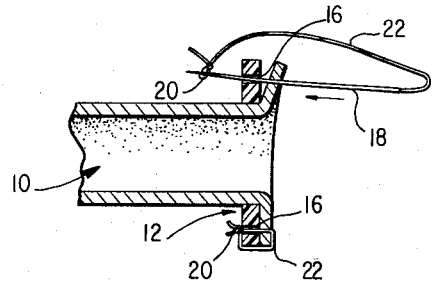
FIG. 3
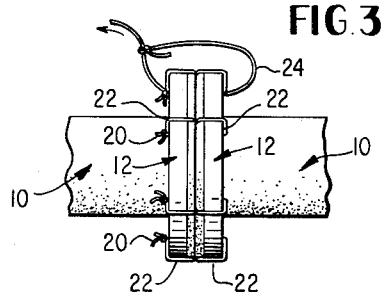
FIG. 6
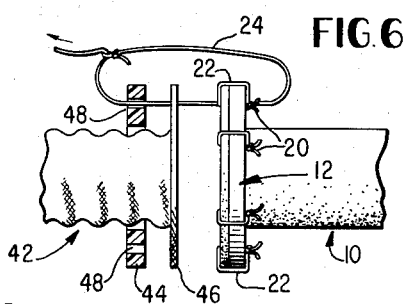
FIG. 4
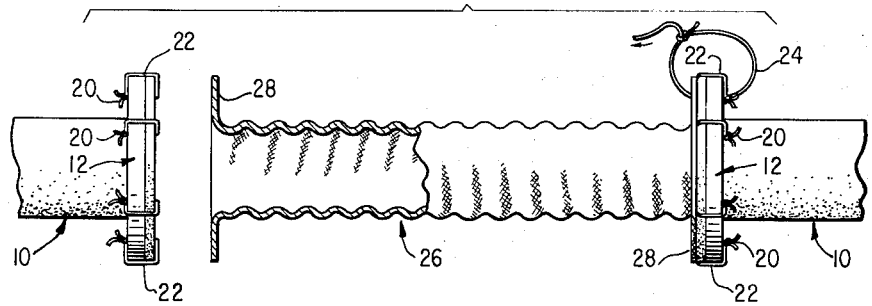
FIG. 7
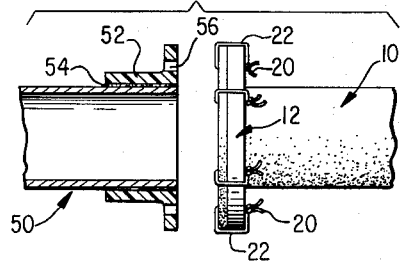
FIG. 5
INVENTOR.
MICHAEL B. COLLITO
BY
*Shapiro and Shapiro*
ATTORNEYS June 7, 1966  M. B. COLLITO  3,254,651
SURGICAL ANASTOMOSIS METHODS AND DEVICES
Filed Sept. 12, 1962  2 Sheets-Sheet 2
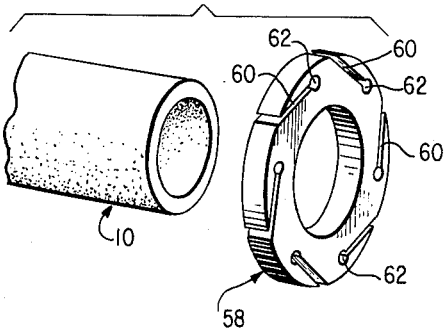
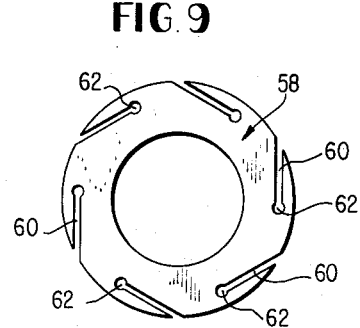
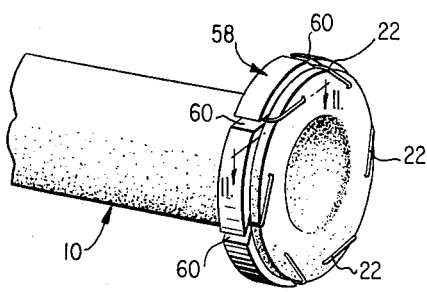
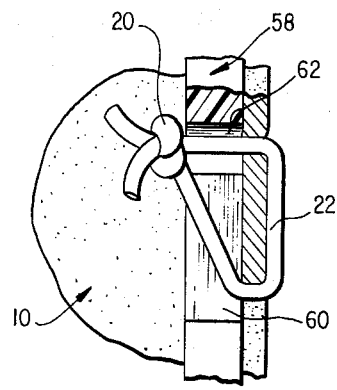
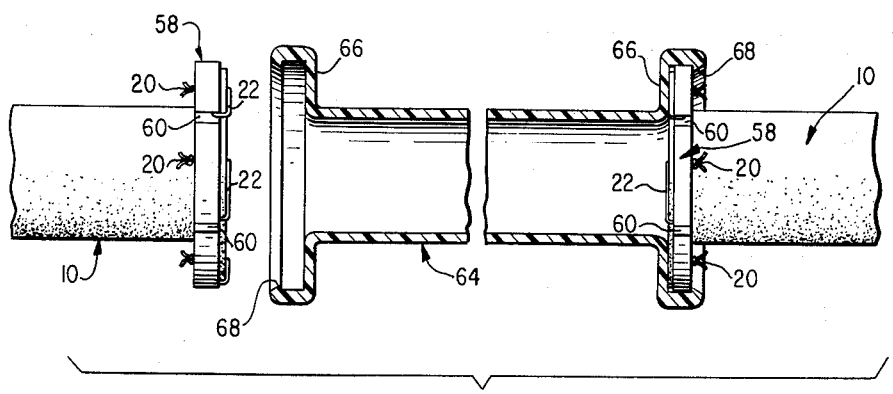
INVENTOR.
MICHAEL B. COLLITO
BY
*Shapiro and Shapiro*
ATTORNEYS

United States Patent Office 3,254,651
Patented June 7, 1966

3,254,651
SURGICAL ANASTOMOSIS METHODS
AND DEVICES
Michael B. Collito, South Orange, N.J.
(% Babies Hospital, 15 Roseville Ave., Newark, N.J.)
Filed Sept. 12, 1962, Ser. No. 223,092
6 Claims. (Cl. 128—334)

This invention relates to surgical methods and devices, and more particularly to methods and devices for anastomosis or the surgical repair of small blood vessels and the like, which do not damage the intima within the area of blood flow.

It has heretofore been proposed to repair blood vessels by removing a damaged or defective portion and joining the ends of the remaining vessel parts. While such procedures are theoretically sound, in practice failures have been experienced due to the difficulties inherent in re-uniting the vessel parts. Procedures in which the ends of the vessel are joined by sutures are difficult and time consuming to execute and produce unreliable results. Not infrequently the junction leaks through the needle punctures, or because of "ballooning" or aneurysmal dilitation of the vessel between the sutures or because of inability to establish a firm abutment of the vessel ends. Moreover, it is often impractical or impossible to join the vessel ends directly when an appreciable length of vessel is excised, and heretofore there has been no simple, reliable means for installing a substitute or prosthesis in place of the excised defective vessel part.

It is accordingly a principal object of the present invention to provide improved surgical methods and devices for solution of the foregoing problems.

A further object of the invention is to provide unique methods and devices for anastomosis and similar procedures, for the correction and repair of body member anomalies and injuries, and for the substitution and transplanting of body organs.

Another object of the invention is to provide unique prosthetic devices and methods of installing the same.

An additional object of the invention is to provide methods and devices of the foregoing type which are simpler and more reliable than comparable methods and devices known heretofore.

Briefly stated, and without limitation, the present invention is concerned with the association of connector devices with body members, and especially blood vessels, in such a way that parts of the body members may be readily joined to each other or to prosthetic devices or other members. In general, the techniques of the invention employ devices which are attached to the ends of vessel parts by sutures and which in turn are attached to a prosthetic device or are joined by sutures to unite the vessel ends.

The foregoing and other objects, advantages, and features of the invention, and the manner in which the same are accomplished will become more readily apparent upon consideration of the following detailed description of the invention taken in conjunction with the accompanying drawings, which illustrate preferred and exemplary embodiments (proportions being varied for clarity of explanation), and wherein:

FIGURE 1 is a fragmentary perspective view illustrating the prospective assembly of a connector device of the invention with a vessel end;

FIGURE 2 is a fragmentary sectional view illustrating the manner in which the connector device is attached to the vessel end;

FIGURE 3 is an elevation view illustrating the manner in which prepared vessel ends are joined to accomplish anastomosis in accordance with the invention;

FIGURE 4 is a partly sectional elevation view illustrating a stage in the installation of a vessel prosthesis in accordance with one form of the invention;

FIGURE 5 is a partly sectional elevation view illustrating the use of a modified prosthetic device;

FIGURE 6 is a partly sectional elevation view illustrating the use of a modified prosthetic device;

FIGURE 7 is a partly sectional elevation view illustrating the use of still a different form of prosthesis;

FIGURE 8 is a fragmentary perspective view illustrating a prospective attachment of a modified connector device to a vessel end;

FIGURE 9 is an end view of the connector device shown in FIGURE 8;

FIGURE 10 is a fragmentary perspective view illustrating the manner in which the modified connector device is assembled with the vessel end;

FIGURE 11 is an enlarged fragmentary sectional view taken along line 11—11 of FIGURE 10; and FIGURE 12 is a partly sectional elevation view illustrating the use of a modified prosthetic device in conjunction with the connector device of FIGURES 8 through 11.

An important concept of the invention lies in the secure attachment of a connector device to a vessel end before the end is joined to another vessel end, to a prosthetic device, or other member. Referring to the drawings, and initially to FIGURE 1 thereof, reference numeral 10 designates the end part of a blood vessel, such as a small vein or artery, which has been cut in preparation for anastomosis. The surgical techniques involved to place the vessel in condition for anastomosis are well known and have been stated in co-pending application Serial No. 180,462, filed March 19, 1962. In general, the vessel is carefully exposed, using a solution such as procaine to prevent spasm. The vessel may be denuded to adventitia and then dried. Bulldog clamps or the like may be utilized to interrupt temporarily the blood supply through the vessel in order that a defective or injured portion of the vessel may be excised by the use of a scalpel or similar instrument. The end parts of the vessel which remain may be irrigated with normal saline solution and dried of excess moisture.

In accordance with the invention, the prepared vessel end 10 is associated with a connector device 12, which in a preferred form of the invention is a flat ring with a central opening 14 proportioned to fit the outside diameter of the vessel and with a plurality of circumferentially spaced axial holes 16. It is contemplated that the connector devices will be made available with a range of inner diameters suitable for use with vessels of different size. The ring is slipped onto the vessel end until it rests somewhat back from the terminus, and then the extremity of the vessel is drawn outwardly or partially everted. The vessel end is attached to the ring by sutures as shown in FIGURE 2, the needle 18 preferably being passed first through the lumen and then through a hole 16 of the ring. The surgical thread 22 is provided with a knot 20 (shown diagrammatically). The knot is drawn and tightened directly behind the ring as shown at the bottom of FIGURE 2, so that the exterior of the vessel end is drawn into tight abutment with one side of the ring. Any conventional tying method for making surgical knots may be used. The suturing is continued until a firm attachment of the vessel end to the ring is insured. When this has been accomplished, the vessel end is ready for junction with a similarly prepared vessel end, with a prosthetic device, or with another member.

FIGURE 3 illustrates the completion of the anastomosis by the junction of identically prepared vessel ends. As shown, the lumen of one outwardly turned vessel part is brought into abutment with the corresponding lumen of the other vessel part, the rings 12 being aligned to insure unobstructed communication through the junction. Anastomosis of the vessel parts is accomplished by suturing the rings together, utilizing the same holes 16 previously employed. The surgical thread 24 is simply pulled through the aligned openings 16 and securely tied as before. Alignment of the openings may be readily judged by the positions of the sutures 22, or other alignment marks may be provided. In lieu of joining the rings by sutures, clamp rings and the like may be employed as taught in the aforementioned co-pending application.

FIGURE 4 illustrates the installation of a prosthetic device 26 in accordance with the invention. This device may be a flanged tube, such as a crimped or corrugated knitted Teflon graft similar to the Teflon graft now employed in arterial surgery. Such tubes are slightly porous, which permits firm attachment of the neointima. The graft material is available in various lengths and diameters to accommodate different needs. The crimping provides adequate crush resistance while maintaining the desired flexibility. Other types of prosthetic devices, as of conventional woven and fabricated materials, either flexible or rigid, may also be employed in the procedures of the invention. For example, devices of glass, metal, or plastics (including Dacron) may be used.

The techniques of sterilization, preclotting, etc. involved in use of prosthetic devices of the type shown in FIGURE 4 are well known and need not be described. In the utilization of the device in accordance with the invention the vessel ends which previously have been attached to the rings 12 in the manner described above, are now joined to outwardly turned flanges 28 at the ends of the prosthesis, the flanges being preformed or constituted during the operative procedure. Each flange is abutted with the outwardly turned lumen of a corresponding vessel end, and when the proper alignment has been insured, the flanges 28 are sutured to the rings and the interposed vessel parts by passing the surgical thread through the openings 16 and tying the thread tightly behind the rings as illustrated at the right side of FIGURE 4. Both anastomoses are completed in this manner.

FIGURE 5 illustrates a somewhat different prosthetic embodiment of the invention. In this figure the prosthetic device 30 has its flanges 32 (only one flanged end being shown for simplicity) backed by rings 34. The rings 34 are located on the prosthetic tube (which is shown uncrimped but which may be crimped in this and other embodiments of the invention). The rings 34 may be constructed like the rings 12 previously described and have circumferentially spaced axial holes 36. These holes are aligned with preformed holes 38 in the flanges 32, and such preformed holes may also be employed in the embodiment of FIGURE 4 if desired. Each backing ring 34 may be attached to its flange 32 by a layer of adhesive 40 or by any other suitable means that will securely attach the backing ring 34 to its flange 32. The Eastman 910 adhesive described in the aforementioned co-pending application is suitable for surgical application, especially when the materials to be joined are appropriately selected.

The prosthetic device of FIGURE 5 is employed in the same manner as the device of FIGURE 4, being sutured to the prepared end of the vessel. The advantage of the construction of FIGURE 5 is that the possibility of ballooning between the sutures is eliminated by virtue of the increased pressures exerted between the backing ring 34 and the ring 12 uniformly around the junction.

FIGURE 6 illustrates another modification in which the prosthetic device 42 is a flanged tube having backing rings 44 which are not permanently attached to the flanges 46 prior to the anastomosis. As shown the anastomosis is accomplished by passing the surgical thread 24 through the axial openings 48 of the backing ring 44 and the aligned openings of the corresponding ring 12, the thread being drawn up tightly and tied behind one of the rings to insure firm abutment between the flanges 46 and the corresponding outwardly turned vessel ends. The attachment of rings 44 to the corresponding flanges 46 thus occurs simultaneously with the anastomosis.

FIGURE 7 illustrates still another prosthetic device 50 employing an unflanged tube with rings 52 secured to the tube ends and providing the desired flanges. The rings may have elongated central portions to facilitate attachment to the tubing by adhesive 54, sutures, or other suitable means. The flange portion of each ring is provided with the axial holes 56 as in the previous embodiment, and the anastomosis is accomplished by suturing in the manner previously described.

In place of completing the anastomosis by suturing, clamp rings or clips may be employed to join the adjacent connector ring-flange parts in the manner described in the aforementioned co-pending application. FIGURES 8 through 12 illustrate another form of the invention which is especially constructed to provide a snap ring or snap button connection. FIGURE 8 illustrates the vessel end 10 and connector ring 58 oriented as in FIGURE 1. Ring 58 replaces the ring 12 previously employed and has a plurality of skewed or canted axial slots 60 which are open at the periphery of the ring and which may be oriented at about 30 degrees to a tangent at the opening. Each slot may terminate inwardly in a hole 62 corresponding to the holes 16 previously described, so that the ring may be employed in place of ring 12 in each of the embodiments already set forth. If the ring is to be employed, however, solely in the application now to be described, the holes 62 might be eliminated. The preferred arrangement of slots and holes is clearly illustrated in the end view of FIGURE 9.

As shown in FIGURES 10 and 11 the ring is attached to the vessel end by sutures which pass through the outwardly turned lumen through the holes 62 as well as around the edge of the vessel ends and through the slots 60, the sutures being tied behind the ring as shown in FIGURE 11. The knot in the sutures are made large enough to prevent passage through the holes 62. The provision of the slots eliminates the protrusion of sutures over the edge of the ring. Now the rings may be readily snap fitted to a prosthetic device 64 as shown in FIGURE 12.

The prosthetic device 64 may be a tube of the type previously described provided with open re-entrant flanges 66 at the ends. The lip provided at the forward edge of each flange may be chamfered at 68 to facilitate insertion of the rings 58 into the corresponding flange receptacles. These receptacles are configured as shown at the right side of FIGURE 12 to receive and fit the rings, the rings being retained by virtue of the radial edge of the lip behind the chamfer 68. To provide this snap fit the prosthetic device, or at least its flanges, must be formed of a suitable somewhat resilient material, such as one of the well known plastics. As an alternative, the snap connection may also be constituted by placing the female or receptacle portion on the ring 58 and the male portion on the flanges of the prosthetic device.

Suitable materials for the prosthetic devices have already been mentioned. The connector rings may be formed of materials such as stainless steel or other metal, plastic, or hard rubber, for example. The rings, prosthetic devices, and sutures may also be fabricated of absorbable materials, so that ultimately (e.g., within 2 to 90 days) the materials will be absorbed by the body, and no foreign matter will remain.

While the invention has been described principally in connection with vascular surgery, it will be appreciated by those skilled in the art that the principles of the invention are applicable to other types of surgical procedures, such as the repair or mending of the intestine. It will also be appreciated that the invention is applicable to the substitution or transplanting of body members or organs. This is accomplished by providing the vessels of the member or organ with connector rings of the type described and by affixing such connector devices to similar devices already attached to the receptive vessels of the body.

Therefore, while preferred embodiments of the invention have been shown and described, it will be apparent to those skilled in the art that changes can be made in these embodiments without departing from the principles and spirit of the invention, the scope of which is defined in the appended claims. For example, rings 58 may be used in place of rings 12 simply to obtain more rapid attachment. Accordingly, the foregoing embodiments are to be considered illustrative, rather than restrictive of the invention, and those modifications which come within the meaning and range of equivalency of the claims are to be included therein.

The invention claimed is:

1. In a method of anastomosis, the steps of fixing a ring device to the end of a living tubular vessel part, and then snap fitting said ring device into an open receptacle at the end of a prosthetic device.

2. The method of claim 1, said ring device being fixed to said vessel end by slipping the device over the vessel end, turning the vessel end outwardly against an end face of said device, and suturing the device to the vessel end.

3. In a method of anastomosis and the like, the steps of placing upon a living tubular vessel end a ring having slots extending inwardly from its periphery, turning outwardly the vessel end upon one side of the ring, and passing sutures through the outwardly turned vessel end and through said slots, and around the edge of said vessel end and through said slots.

4. The method of claim 3, further comprising the step of snap fitting said ring into an open receptacle at the end of a prosthetic device.

5. An anastomosis device, comprising a substantially flat ring of living-body-absorbable material, said ring having an inner diameter fitting the outer diameter of the end of a living tubular vessel part and being adapted to be slipped over said end and to have the vessel part everted against one side of the ring, said ring having a plurality of circumferentially spaced openings therethrough adapted to receive sutures for securing the vessel part to the ring, said openings comprising slots which extend inwardly of the ring from the periphery thereof and each of which forms a small acute angle with respect to a tangent to the ring, whereby the sutures are securely retained in said slots without projecting over the periphery of the ring.

6. An assembly for providing a connection to a living body tubular vessel part, comprising a graft tube having a resilient re-entrant receptacle at at least one end thereof, and a ring having an inner diameter fitting the outer diameter of the end of the vessel part and being adapted to be slipped over said end of the vessel part and affixed thereto, said ring having an outer configuration matching the inner configuration of said receptacle, whereby the ring may be snap-fitted into the receptacle.

References Cited by the Examiner

UNITED STATES PATENTS

| | | | |
|---|---|---|---|
| 418,442 | 12/1889 | Brock. | |
| 434,117 | 8/1890 | Ricketts | 285—237 |
| 1,344,227 | 6/1920 | Hauman | 128—334 |
| 2,127,903 | 8/1938 | Bowen | 3—1 |
| 2,649,590 | 8/1953 | Cutler | 3—13 |
| 2,836,181 | 5/1958 | Tapp | 128—334 |
| 2,985,469 | 5/1961 | Bowman | 285—260 |
| 3,048,177 | 8/1962 | Takaro | 128—334 |
| 3,155,095 | 11/1964 | Brown | 128—334 |

OTHER REFERENCES

Lespinasse et al.: "A Practical Mechanical Method of End-to-End Anastomosis of Blood-Vessels," from JAMA, Nov. 19, 1910, vol. 55, pp. 1785–1790.

RICHARD A. GAUDET, *Primary Examiner.*

JORDAN FRANKLIN, *Examiner.*

DALTON L. TRULUCK, *Assistant Examiner.*